United States Patent [19]

Senderoff

[11] 3,751,298

[45] Aug. 7, 1973

[54] THERMAL, RECHARGEABLE ELECTROCHEMICAL CELL HAVING LITHIUM MONOALUMINIDE ELECTRODE AND LITHIUM TETRACHLOROALUMINATE ELECTROLYTE

[75] Inventor: Seymour Senderoff, Fairview, Ohio

[73] Assignee: Union Carbide Corporation, New York, N.Y.

[22] Filed: May 21, 1971

[21] Appl. No.: 145,703

[52] U.S. Cl............ 136/6 F, 136/83 T, 136/100 R, 136/6 LF
[51] Int. Cl. ......................................... H01m 21/14
[58] Field of Search ............... 136/83, 100, 6, 153, 136/155, 86

[56] References Cited
UNITED STATES PATENTS

| 3,415,687 | 12/1968 | Methlie............................. 136/100 |
| 3,428,493 | 2/1969 | Adams........................... 136/100 R |
| 3,445,288 | 5/1969 | Buzzelli................................... 136/6 |
| 3,410,730 | 11/1968 | Rightmire et al................... 136/100 |
| 3,462,312 | 8/1969 | Rightmire et al................... 136/100 |
| 3,567,516 | 3/1971 | Rightmire et al...................... 136/6 |

Primary Examiner—Anthony Skapars
Attorney—James C. Arvantes, John R. Doherty and Cornelius F. O'Brien

[57] ABSTRACT

Thermal, rechargeable electrochemical cells are disclosed which have, in the charged condition, a lithium monoaluminide anode and a lithium tetrachloroaluminate electrolyte. The cathode can be any suitable material.

6 Claims, 1 Drawing Figure

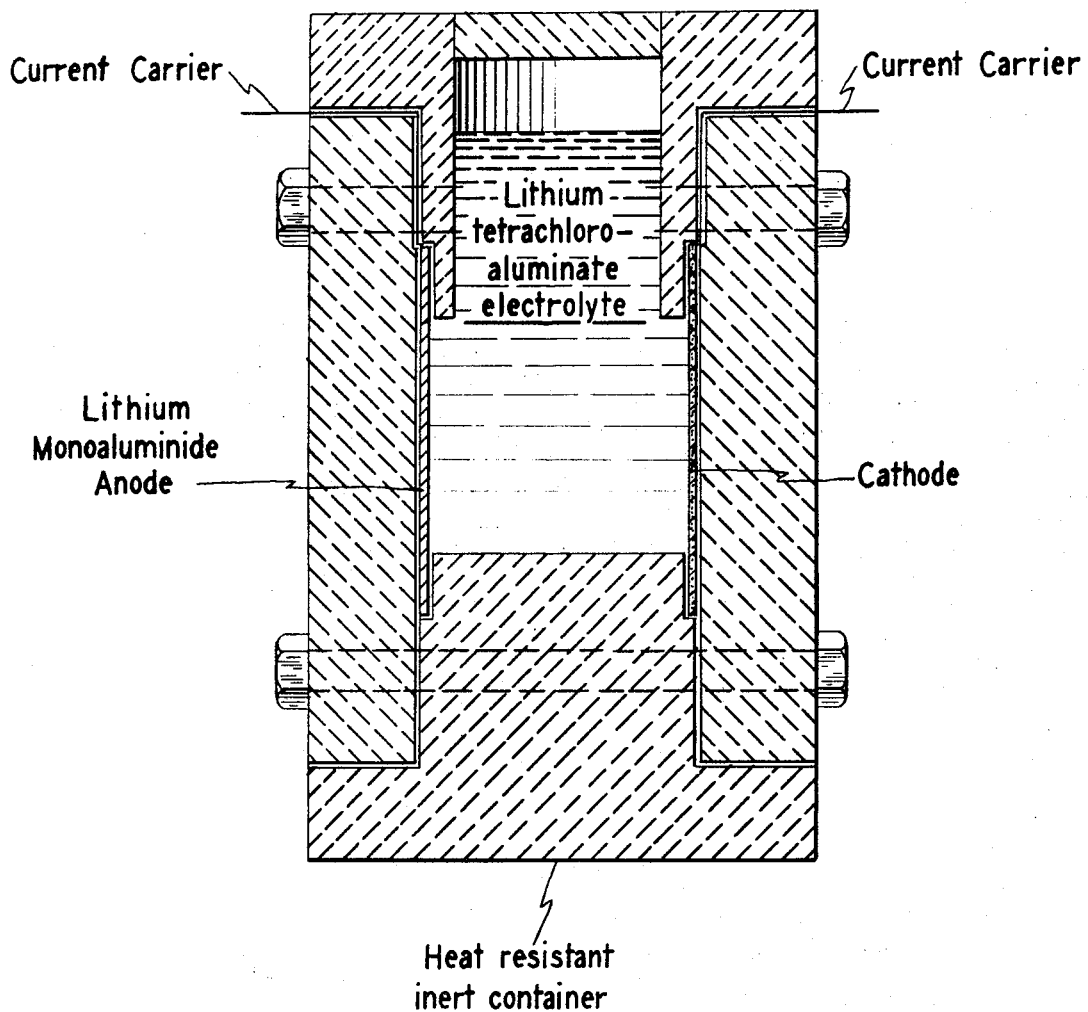

THERMAL, RECHARGEABLE ELECTROCHEMICAL CELL HAVING LITHIUM MONOALUMINIDE ELECTRODE AND LITHIUM TETRACHLOROALUMINATE ELECTROLYTE

The invention relates to a thermal, rechargeable electrochemical cell having a lithium monoaluminide electrode and a lithium tetrachloroaluminate electrolyte.

Thermal cells are cells in which the electrolyte is a fused salt, the cell being operative when the electrolyte is molten, and electrochemically inert when the electrolyte is solid. Among the types of thermal cells that have been the subject of considerable study are those containing lithium anodes, since the electrochemical potential of lithium is quite high. However, since the melting point of lithium (108.5°C.) is much lower than the operating temperature of most thermal cells, considerable attention has been given to methods for maintaining the lithium-containing anode in the solid state at cell operating temperatures. One of the means for attaining this objective has been to alloy lithium with aluminum. Thus, thermal cells have been disclosed which employ anodes composed of mixtures of lithium and aluminum. For instance, such anodes for thermal cells are disclosed in Adams, U. S. Pat. No. 3,428,493, Buzzelli, U. S. Pat. No. 3,445,288, and a series of patents to R. A. Rightmire et al., U. S. Pat. Nos. 3,410,730; 3,410,731; 3,462,312 and 3,462,313. In each one of the aforementioned patents, the active material in the lithium-aluminum anode is lithium. These patents disclose that during charge and discharge of the cells utilizing the lithium-aluminum anodes, it is lithium that moves out of and back into the anode. The electrolytes disclosed for use with the lithium-aluminum anodes described by these patents are alkali metal halides, alkaline earth metal halides, or mixtures thereof. The proportion of lithium in the lithium-aluminum anode of the Adams patent is from 2 to 30 weight per cent (that is, from 8 to 62 atomic per cent lithium), and with all of the other patents, the proportion of lithium in the anode is from about 5 to 30 weight per cent (that is, from about 18 to about 62 atomic per cent lithium).

It has long been recognized that there would be many advantages in the provision of a thermal cell utilizing aluminum as the active material in the anode in conjunction with a molten electrolyte based on aluminum chloride. These advantages include low operating temperature, high theoretical energy density, and low cost. However, it has been observed by others (1,2,3) (1. NASA CR 72791, AI-70-46, Voltammetric Screening of Electrodes in Fused Salt Electrolyte, by L.E. Topol, W.A. McCollum, Jr. and S.J. Yosim. Final Rept. on Contract NAS 3-12970, Dec. 31, 1970, pp. 183-187. 2. Aluminum Chlorine Battery, by J. Giner and L. Holleck, Final Rept. on Contract NAS 23-688, June 1970, p. 1. 3. B. Tremillon and G. Letisse, J. Electroanal. Chem. 17, 371-386 (1968).) and confirmed by the inventor herein that the aluminum anode polarizes severely in electrolytes containing aluminum chloride mixed with potassium chloride and/or sodium chloride. This severe polarization of an aluminum anode has also been found to occur with aluminum chloride-lithium chloride electrolytes.

The present invention is based on the discovery that if one electrolyzes a lithium chloride-aluminum chloride (1:1 molar ratio) electrolyte, the material deposited at the cathode does not polarize to any appreciable extent, and it discharges as an anode at the aluminum potential. The active material was identified as lithium monoaluminide. The magnitude of the difference in performance between a pure aluminum electrode and a lithium monoaluminide electrode (with LiCl-AlCl$_3$ electrolyte) is shown by the fact that pure aluminum polarized by more than 0.4V when run anodically at 30 mA/cm$^2$ while lithium monoaluminide showed less than 0.050V polarization at current densities ranging from 30 to 100 mA/cm$^2$.

It is an object of this invention to provide a thermal, rechargeable electrochemical cell, the anode of which discharges at the aluminum potential with negligible polarization.

It is another object of the invention to provide a thermal, rechargeable electrochemical cell having a lithium monoaluminide anode.

Another object of the invention is to provide a thermal, rechargeable electrochemical cell having a lithium monoaluminide anode and a lithium tetrachloroaluminate electrolyte.

A further object of the invention is to provide an electrochemical cell wherein the active anode material is the compound lithium monoaluminide.

These and other objects of the invention will be apparent from the following description, taken in conjunction with the accompanying drawing, wherein:

The sole FIGURE is a schematic elevation, in cross section, of a thermal cell to which the principles of the invention can be applied.

The electrochemical cell of the invention comprises an anode, a cathode, and an electrolyte in contact with said anode and said cathode, wherein (in the charged condition) the anode comprises lithium monoaluminide, and the electrolyte comprises lithium tetrachloroaluminate.

The lithium monoaluminide electrode can be produced by a variety of methods. For instance, the electrode can be produced by melting lithium and aluminum together in the appropriate proportions, said proportions being discussed more fully below. Alternatively, the electrode can be produced by electroforming, either on an aluminum screen or on a metal screen that in inert in the environment such as nickel, silver and copper. The electrolyte that is employed for the electroforming operation is lithium tetrachloroaluminate. The Examples below contain a description of the conditions used for one such electroforming operation.

The lithium monoaluminide that is employed as an electrode in the electrochemical cell of the invention is a stable compound composed of equimolar proportions of lithium and aluminum. It has a characteristic X-ray diffraction pattern and a melting point of 718°C., which is higher than both pure lithium and pure aluminum. The lithium monoaluminide electrode of the invention need not contain exactly equimolar proportions of the two components. However, when less than 50 atomic per cent of lithium is employed, polarization of the anode is encountered. Also, when more than about 50 atomic per cent of lithium is found in the electrode, the electrode tends to chemically react with the electrolyte and above 63 atomic per cent, this reaction becomes rather rapid. Accordingly, it is preferred that the lithium monoaluminide electrode have an overall proportion of from about 50 to about 63 atomic per cent lithium. (This is equivalent to from about 20 to about 30 weight per cent lithium.)

The electrolyte that is employed in the electrochemical cell of the invention is lithium tetrachloroaluminate. This material, which has an overall formula of LiAlCl$_4$, can be considered to be an equimolar compound of lithium chloride and aluminum trichloride.

The desired electrolyte is pure lithium tetrachloroaluminate, LiAlCl$_4$. When used with solid metal chloride cathodes or chlorine gas cathodes, the discharge reaction creates more electrolyte and the charging reaction consumes it. For example, the total cell reaction with a CuCl$_2$ cathode and LiAl anode is:

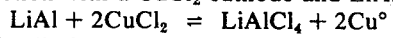

the discharge reaction proceeding toward the right and the charge reaction toward the left. With a chlorine cathode the equivalent processes are:

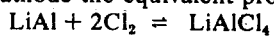

When oxygen gas or oxide electrodes are used, oxychloride salts of varying compositions may be formed in the LiAlCl$_4$ electrolyte, i.e., LiAlOCl$_2$, LiAl$_2$OCl$_5$, AlOCl, Li$_3$OCl, etc. Also, a moderate excess of AlCl$_3$ can be tolerated by the electrolyte. The melting temperature is lowered to 114°C. at approximately 60 mol per cent AlCl$_3$, but the volatility of the electrolyte increases slightly. With an AlCl$_3$ content greater than 60 mol per cent, the melting temperature and volatility both increase. With 64 mol per cent AlCl$_3$, the melting point is the same as LiAlCl$_4$ (143°C.) and the volatility only slightly greater. No excess of LiCl is present in the electrolyte since it is essentially insoluble in LiAlCl$_4$ at 150°–200°C. and its solubility is less than 0.5 per cent at 350°C.

The cathode can be any of a wide variety of materials, such as silver chloride, copper chloride, copper chloroaluminate, nickel chloride, nickel fluoride, cuprous oxide, cupric oxide, oxygen/carbon, air/carbon, and chlorine/carbon. The chloride electrodes can be either electroformed, or they can be pasted on a suitable substrate such as a nickel or copper screen. The oxide electrodes are preferably made as pasted electrodes by standard methods. The gas electrodes are made with porous inert collector materials such as carbon or graphite, in accordance with conventional procedures.

The operating temperature of the cell is above 143°C., the melting point of the electrolyte. It has been operated successfully at 150°–250°C. and preferably a 150°–200°C. Between 150° and 250°C., the solubility of Al$_2$O$_3$ (used as container and separator) was about 1 per cent, NiCl$_2$ and CuCl$_2$ less than 0.05 per cent, and NiF$_2$ and CuF$_2$ less than 100 ppm. AgCl dissolved at a concentration of about 2.5 per cent, and would require an effective separator to prevent reaction with the anode. Since moisture in the air hydrolyzes the electrolyte, the cell must be protected from it, preferably by sealing the cell in a suitable container such as alumina. If an air electrode is used, the air should be dried.

The electrochemical cells of the invention have utility as rechargeable batteries for portable radio transmitters, domestic applications such as lawn mowers, and the like.

The example which follows illustrates the practice of the invention. All parts and percentages stated herein are by weight, unless otherwise indicated.

EXAMPLE

A cell is prepared by melting equimolar quantities of LiCl and AlCl$_3$ (usually with slight excess of LiCl which remains as a solid residue) under an inert atmosphere. HCl is evolved and dark-colored impurities are precipitated leaving a clear supernatant liquid. On freezing, the lower dark portion containing impurities is discarded, and the upper nearly white portion is used as electrolyte. The electrolyte is added to a glass, alumina, or polytetrafluoroethylene container; a separator of either porous glass frit or porous alumina may optionally be inserted between anode and cathode.

The LiAl anode may be prepared by electrolyzing a nickel or aluminum expanded metal screen as cathode at current densities from 5 to 100 mA/cm$^2$ (preferably 50–100 mA/cm$^2$) and at temperatures of 150°–200°C., in a similar electrolyte using an aluminum anode. Occasional additions of LiCl are made to replenish the lithium removed. Alternatively, it may be prepared by melting together equimolar quantities of Li and Al at 850°C. in a recrystallized alumina crucible, freezing and grinding the product, and pressing the resulting powder into a nickel or aluminum expanded metal screen.

The cathode, if a metal compound, is made by the usual pasted cathode techniques wherein a compound, e.g., CuCl$_2$, is mixed with a binder (gelatin) and conductor (carbon and graphite powder). The resultant paste is trowelled onto a copper or nickel expanded metal screen and then dried at 130°C. The collector for a gas cathode can be porous graphite or carbon sealed to the side of the cell with access to a gas space (air, oxygen, or chlorine). Thus, with a gas cathode, the cell shown in the FIGURE would be modified by substituting a gas space for the container wall adjacent to the cathode.

A LiAl/LiAlCl$_4$/CuCl$_2$ cell prepared as indicated above has an open circuit voltage of 0.94V and discharges to yield copper at the cathode in a single step, 2-electron reaction at potentials between 0.86 and 0.80V between 5 and 100 mA/cm$^2$ at temperatures between 150° and 200°C.

Other cathodes used with the same LiAl anode and LiAlCl$_4$ electrolyte had the following open circuit voltages:

| Cathode Material | Voltage |
| --- | --- |
| NiCl$_2$ | 1.1 |
| AgCl | 0.8 |
| Cu(AlCl$_4$) | 0.88 |
| NiF$_2$ | 1.3 |
| Cu$_2$O | 0.9 |
| CuO | 0.87 |
| C,Cl$_2$ | 2.1 |
| C,O$_2$ | 1.7 |

On discharge of the LiAl/LiAlCl$_4$/CuCl$_2$ cell, the LiAl dissolves and the CuCl$_2$ is converted to copper with the formation of more LiAlCl$_4$ electrolyte. On recharging, the LiAl redeposits as an adherent sponge and the copper is converted back to CuCl$_2$. If NaCl or KCl is substituted for the LiCl in the LiAlCl$_4$ electrolyte to make instead NaAlCl$_4$ or KAlCl$_4$, recharging is impractical because Al rather than LiAl is deposited to form the anode, and this polarizes severely on discharge. The deposition of Al only from these melts is owing to the fact that there are no stable intermetallics or appreciable mutual solubility in the Al–K and Al–Na phase diagrams.

For best operation of the cell, the stoichiometry of the lithium monoaluminide is preferably close to 1:1 (atom ratio). Within the range of 50–63 atom per cent Li, the anode showed less than 40 mV of polarization after 4 hours of operation at 30 mA/cm². With 45 atom per cent Li, the anode polarized by 0.1V in 30 minutes. With 20 atom per cent Li, it polarized by 0.2V in 90 seconds. All Li-Al mixtures containing 15 atom per cent or less of Li behaved much like aluminum, polarizing instantly by 0.3 to 0.4V at very low current densities. It is significant that below 15 atom per cent Li, x-ray diffraction lines for LiAl were not observed. From 15 to nearly 50 atom per cent Li, both Al and LiAl lines were seen. At 50 atoms per cent Li, the Al lines had virtually disappeared and LiAl lines were predominant.

The LiAl anode in contact with the electrolyte was stable and showed no changes after a few hours immersion. As Li was increased beyond 50 atom per cent, the anode darkened rapidly on contact with the electrolyte. When 63 atom per cent Li was reached, severe corrosion and roughening of the anode was observed after brief immersion about 30 minutes in the electrolyte. With higher lithium content than 63 atom per cent, the anode was severely attached and disintegrated rapidly.

What is claimed is:

1. A thermal electrochemical cell having an anode, a cathode, and a normally solid, but fusible electrolyte in contact with said anode and said cathode, wherein, in the charged condition:
   a. said anode consists essentially of lithium monoaluminide; and
   b. said electrolyte consists essent lithium tetrachloroaluminate; said said cell being operable at a temperature at which said electrolyte is in a molten condition.

2. The thermal electrochemical cell of claim 1 wherein said anode has from about 50 to about 63 atomic per cent lithium, and from about 37 to about 50 atomic per cent aluminum.

3. The thermal electrochemical cell of claim 2 wherein the cathode is silver chloride, copper chloride, copper chloroaluminate, nickel chloride, nickel fluoride, cuprous oxide, cupric oxide, oxygen/carbon, air/carbon, or chlorine/carbon.

4. The thermal electrochemical cell of claim 3 wherein the cathode is copper chloride.

5. The thermal electrochemical cell of claim 2 wherein the anode consists essentially of about 50 mole per cent lithium and about 50 mole per cent aluminum.

6. In a thermal, rechargeable electrochemical cell having an anode, a cathode, and a normally solid, but fusible electrolyte in contact with said anode and said cathode, the improvement wherein:

said anode consists essentially of lithium monoaluminide; and said electrolyte consists essentially of lithium tetrachloroaluminate; said said cell being operable at a temperature at which said electrolyte is in a molten condition.

* * * * *

PO-1050
(5/69)

UNITED STATES PATENT OFFICE
CERTIFICATE OF CORRECTION

Patent No. 3,751,298     Dated August 7, 1973

Inventor(s) S. Senderoff

It is certified that error appears in the above-identified patent and that said Letters Patent are hereby corrected as shown below:

IN THE CLAIMS:

Claim 1, column 6, line 1, "essent" should be -- essentially of --

Claim 6, column 6, line 25, delete one of the words "said".

Signed and sealed this 7th day of January 1975.

(SEAL)
Attest:

McCOY M. GIBSON JR.
Attesting Officer

C. MARSHALL DANN
Commissioner of Patents